US012526594B2

(12) United States Patent
Serman et al.

(10) Patent No.: US 12,526,594 B2
(45) Date of Patent: Jan. 13, 2026

(54) METHOD AND SYSTEM FOR FITTING A HEARING AID TO A USER

(71) Applicant: Sivantos Pte. Ltd., Singapore (SG)

(72) Inventors: Maja Serman, Erlangen (DE); Cecil Wilson, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 307 days.

(21) Appl. No.: 18/334,509

(22) Filed: Jun. 14, 2023

(65) Prior Publication Data

US 2023/0403523 A1 Dec. 14, 2023

(30) Foreign Application Priority Data

Jun. 14, 2022 (DE) ..................... 10 2022 206 028.8

(51) Int. Cl.
*H04R 25/00* (2006.01)

(52) U.S. Cl.
CPC ............. *H04R 25/70* (2013.01); *H04R 25/65* (2013.01)

(58) Field of Classification Search
CPC ................................ H04R 25/70; H04R 25/65
USPC .......................................................... 381/312
See application file for complete search history.

(56) References Cited

U.S. PATENT DOCUMENTS 10,284,965 B2 5/2019 Aschoff
10,827,285 B2 11/2020 Hannemann et al.
2007/0071262 A1 3/2007 Rass
2008/0124685 A1 5/2008 Chalupper
2017/0127193 A1 5/2017 Husung
2021/0092534 A1* 3/2021 Fichtl .................. H04R 25/505

FOREIGN PATENT DOCUMENTS

DE 102005046168 A1 4/2007
DE 102006047690 A1 4/2008
DE 102009043775 A1 4/2011
DE 102015219573 A1 4/2017
DE 102015221187 A1 5/2017
DE 102016209329 A1 11/2017
DE 102017214163 B3 1/2019
WO 2023015013 A1 2/2023
WO 2023034347 A1 3/2023

OTHER PUBLICATIONS

Palmer, C. et al.,: Fine Tuning Your Heart: a novel method for measuring interoceptive accuracy. Stand 26.07.2020. URL: https://psyarxiv.com/qz7r9/ [retrieved on Apr. 3, 2023].

Van Elk, Michiel, et al. "Suppression of the auditory N1-component for heartbeat-related sounds reflects interoceptive predictive coding." Biological psychology 99 (2014): 172-182.

(Continued)

*Primary Examiner* — Phylesha Dabney
(74) *Attorney, Agent, or Firm* — Laurence A. Greenberg; Werner H. Stemer; Ralph E. Locher

(57) ABSTRACT

A method and a system for fitting or adapting or matching a hearing aid to a user is provided to achieve a high level of acceptance of the user for the hearing aid. In a first step, an interoceptive awareness of the user is established and in a second step, a fitting process for fitting the hearing aid is defined based on the established interoceptive awareness of the user.

18 Claims, 1 Drawing Sheet

(56) References Cited

OTHER PUBLICATIONS

Meyerholz, Luisa, et al. "Contingent biofeedback outperforms other methods to en-hance the accuracy of cardiac interoception: A comparison of short interventions.", Journal of behavior therapy and experimental psychiatry 63 (2019): 12-20.
Paulus, Martin P., et al. "An active inference approach to interoceptive psychopathology." Annual review of clinical psycholo-gy 15 (2019): 97-122.
Ring, Christopher, et al.. "Heartbeat counting is unrelated to heartbeat detection: A comparison of methods to quantify interoception." Psychophysiology 55.9 2018.

* cited by examiner

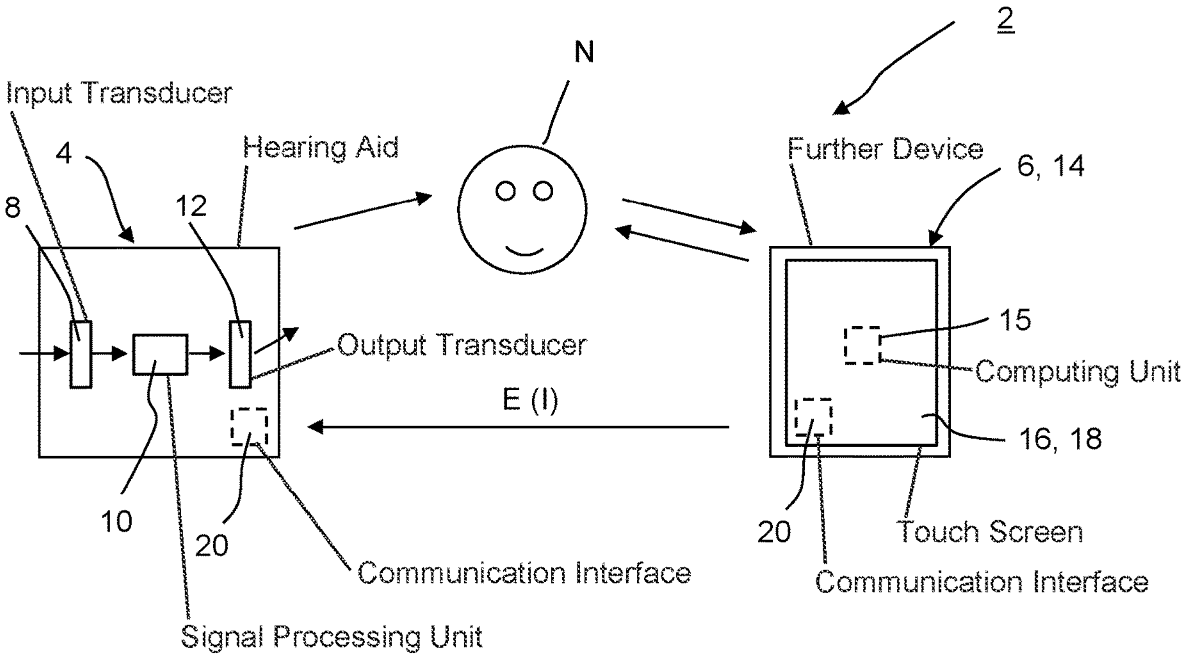
2
N
Input Transducer
4
Hearing Aid
8
12
Output Transducer
10
20
Communication Interface
Signal Processing Unit
E (I)
Further Device
6, 14
15
Computing Unit
16, 18
20
Touch Screen
Communication Interface

METHOD AND SYSTEM FOR FITTING A HEARING AID TO A USER

CROSS-REFERENCE TO RELATED APPLICATION

This application claims the priority, under 35 U.S.C. § 119, of German Patent Application DE 10 2022 206 028.8, filed Jun. 14, 2022; the prior application is herewith incorporated by reference in its entirety.

FIELD AND BACKGROUND OF THE INVENTION

The invention relates to a method and a system for fitting a hearing aid to a user of the hearing aid.

A hearing aid is understood in the present case in particular as a hearing aid device, which is configured to compensate for impairment of a hearing-impaired user. Such hearing aid devices are generally distinguished in that they are fitted to user-specific hearing impairments and process an acoustic or electronic input signal of an input transducer, often an electroacoustic transducer (microphone), by using signal processing and emit a processed output signal at an output transducer, often also an electroacoustic transducer (loudspeaker). In the signal processing, user-specific amplifications, which are fitted to the hearing impairment and are typically frequency-dependent, noise suppression and/or a directionality are typically set. Directionality is generally understood to mean that the hearing aid deliberately amplifies sound signals more strongly which originate from one direction (for example from the position of a sound source) than from other spatial areas.

A hearing aid has to be fitted to the user-specific hearing impairment. A large number of setting parameters are provided for that purpose in modern hearing aid devices, for each of which suitable setting values have to be ascertained in a user-specific manner. That takes place in the context of a fitting process, in which the hearing aid is fitted to the hearing impairment of the user.

Especially for first-time users, who thus wear a hearing aid device for the first time, but also upon a change to a new hearing aid, it is necessary for the user to become familiar with the hearing aid. The acceptance of the user for the hearing aid is also significantly dependent thereon.

Familiarization with the hearing aid properties is especially difficult in complex hearing situations, for example in loud environmental situations.

Experiments have shown that the acceptance of the users varies strongly, even if the users are among a group having very similar or also nearly identical hearing impairments. That applies even if the fitting process is carried out with the assistance of a hearing aid acoustician.

The acceptance represents a special hurdle especially for first-time users and in particular for over-the-counter hearing aids, which are sold to the users directly without the assistance of a hearing aid acoustician.

SUMMARY OF THE INVENTION

It is accordingly an object of the invention to provide a method and a system for fitting a hearing aid to a user and thus to a user-specific hearing impairment, which overcome the hereinafore-mentioned disadvantages of the heretofore-known methods and systems of this general type, specifically in such a way that the highest possible level of acceptance of the hearing aid by the user is generated.

With the foregoing and other objects in view there is provided, in accordance with the invention, a method and a system for fitting a hearing aid to a user, especially to the hearing impairment of a user of the hearing aid, wherein in a first step initially an interoceptive awareness of the user is established and subsequently thereto a fitting process for fitting the hearing aid is defined on the basis of this established interoceptive awareness. The system according to the invention includes for this purpose the hearing aid and a setting device, wherein the setting device is configured to establish the interoceptive awareness and to define the fitting process on the basis of the established interoceptive awareness.

The advantages and preferred embodiments listed hereinafter in conjunction with the method are also to be transferred accordingly to the system and vice versa.

This embodiment is based on the finding that the interoceptive awareness is decisive for the hearing perception of the hearing-impaired person.

The hypothesis has been established until now that cognitive capabilities are able to explain the variance of the speech perception, also designated as speech comprehension, in hearing-impaired persons having similar hearing thresholds, which has not been confirmed, however.

The finding that, even among experienced hearing aid wearers, there are users who do not manage certain hearing aid functions or do not use them indicates that some intrinsic perception processes are destroyed or made difficult by the hearing aid, which requires renewed learning and familiarization, which, if it is not successful, results in deficient acceptance and thus in giving up the hearing aid.

The problem of predicting the acceptance of hearing aids and the familiarization thereto has not been solved up to this point. It has previously been unclear how the acclimatization can be assisted and improved and the effectiveness of hearing aids or certain hearing aid functions can be increased. Up to this point, the assistance of the user by the hearing aid acoustician by testing out over weeks, months, and years of hearing aid use was required for this purpose.

Studies have now shown that persons having a high interoceptive awareness have better hearing perception than persons having a low interoceptive awareness. This means that persons, in spite of comparable hearing impairments, display different hearing perception solely due to their different interoceptive awareness. This is understood to mean that the user having good interoceptive awareness and the same surroundings and hearing conditions has better hearing perception, thus manages the hearing situation better, for example has better speech comprehension than the user having the lower interoceptive awareness.

Thus, for example, internal studies show that users, in spite of comparable hearing impairments, having a high interoceptive awareness had a speech reception threshold (SRT) improved for example by a factor of 2 over users having only low interoceptive awareness. The speech reception threshold is a degree of the correct perception of speech and words in a noisy environment. In order to determine the SRT, a procedure is used in this case in such a way that a certain hearing situation having noise and speech is presented to the user and it is checked how high the percentage of the correctly understood speech/words is. In order to define an SRT value, for example, the ratio of speech to noise (SNR, signal-to-noise ratio) is continuously varied until the user correctly registers a certain percentage (for example 50%) of the speech/words.

Proceeding from this finding, it is now provided according to the invention that the fitting of the hearing aid is performed in dependence on the interoceptive awareness. This means that different fitting processes are carried out in dependence on the established interoceptive awareness, that the type of the fitting of the hearing aid—even with identical hearing impairments—thus differs.

A user having a low interoceptive awareness is typically introduced more softly and slowly to the functionalities and capabilities of the hearing aid than a user having a high interoceptive awareness. Overall, this has the result that the subjective utility for the respective user is classified as particularly high by this user, due to which the acceptance for the hearing aid is correspondingly high.

Interoception generally refers to the (intrinsic) perception and feeling of physical states, in particular to the perception of changes of a physical state. Interoceptive awareness, also referred to as interoceptive perception, is generally understood as the ability to register items of information about such physical states and especially changes of physical states not through the outside world, but rather from and through their own physical sections, thus more or less from the inside.

In the present case, interoceptive awareness is understood in particular as a degree of the correspondence between a (physiological) physical state (especially a perceived change of the physical state) perceived (interoceptively) by the user himself or herself (without external aids) and an actual physical state (or the actual change of the physical state). Especially an intrinsic perception of one's own heartbeat (pulse) is observed for this purpose and compared to the actual heartbeat (pulse) (measured by using a monitor). The heartbeat is a periodically changing physical state (state of the heart).

An interoceptively ascertained physical state, in particular pulse, is understood as the ascertainment of the physical state (one's own pulse) by the user himself or herself without aids such as heart rate monitor but also without feeling the pulse, especially by using the fingers, for example, on the wrist or on the neck.

In addition, there are still further methods for determining the interoceptive awareness. According to a "heartbeat distinguishing method" the intrinsic perception of the pulse in comparison to the frequency of an external signal, for example a tone sequence, is evaluated. The perception is thus observed to what extent the interoceptively registered pulse corresponds to the external signal. The degree of the correspondence between the intrinsic perception (of the correspondence between pulse and external signal) and the actual correspondence between pulse and external signal is also evaluated in this case.

A further known variant for determining interoceptive awareness is based on the evaluation of a questionnaire on the intrinsic perception of a larger spectrum of physical states, in particular their changes. Especially the Body Perception Questionnaire by Stephen W. Porges is a standard.

The perception of states and properties of the sense of hearing, in particular a hearing impairment, such as tinnitus, hearing losses, in particular in the case of certain frequencies or environmental situations, do not fall under interoceptive perception in the present case.

The fitting process and in particular the setting values are especially selected on the basis of the degree of this interoceptive awareness.

According to one preferred embodiment, the system itself is configured for determining the interoceptive awareness of the user: This means that the setting device, possibly in conjunction with the hearing aid or a further device, is configured to establish the interoceptive awareness itself and quasi-measure it. Due to this measure, a complete fitting process including the determination of the interoceptive awareness is therefore carried out by the system as a whole. Alternatively thereto, an interoceptive awareness, which has been determined in some other way, for example already beforehand, could be acquired and defined in this way.

Methods for determining interoceptive awareness are generally known and are described, for example, in:

Van Elk, Michiel, et al. "*Suppression of the auditory N1-component for heartbeat-related sounds reflects interoceptive predictive coding.*" *Biological psychology* 99 (2014): 172-182, or also in Palmer, Clare, Vivien Ainley, and Manos Tsakiris. "*Fine Tuning Your Heart: a novel method for measuring interoceptive accuracy*." (2019).

In the present case, a method is preferably used which is based on modified versions of various known methods, as is described in particular in the publication by Palmer, Clare, Vivien Ainley, and Manos Tsakiris: "Fine Tuning Your Heart: a novel method for measuring interoceptive accuracy."

Further publications which relate to interoceptive awareness are, for example:

Meyerholz, Luisa, et al. "*Contingent biofeedback outperforms other methods to enhance the accuracy of cardiac interoception: A comparison of short interventions.*", *Journal of behavior therapy and experimental psychiatry* 63 (2019): 12-20, Paulus, Martin P., Justin S. Feinstein, and Sahib S. Khalsa. "*An active inference approach to interoceptive psychopathology.*" *Annual review of clinical psychology* 15 (2019): 97-122, Ring, Christopher, and Jasper Brener. "*Heartbeat counting is unrelated to heartbeat detection: A comparison of methods to quantify interoception.*" *Psychophysiology* 55.9 (2018).

In one expedient refinement, in the determination of the fitting process, setting values for setting parameters of the hearing aid are defined on the basis of the interoceptive awareness of the user. Setting parameters of the hearing aid are understood generally as parameters which influence the signal processing of the input signal of the input transducer in the hearing aid and are settable, namely especially those parameters which are set in dependence on and on the basis of the hearing impairment of the hearing-impaired user.

In one preferred embodiment, the setting parameters are the directionality mentioned at the outset or also the noise suppression. A degree of the directionality and/or the noise suppression is therefore set. A high degree of directionality means a high directionality (high direction-dependent amplification), a high degree of noise suppression means a strong suppression of noises and interference noises. These parameters are particularly important for difficult hearing situations in loud surroundings having a large number of acoustic sources, from which one is to be filtered out. This corresponds, for example, to a party situation, in which the hearing-impaired user wishes to converse with a specific person within a room in which many people are located. Such a party situation is of particular interest in the scope of this application and in general for acceptance.

In one preferred embodiment, the degree of noise suppression and/or the degree of directionality is reduced in this case with an increasing interoceptive awareness. Therefore, the higher the established interoceptive awareness is, the lower the noise suppression and/or the directionality is set. This is based on the fact that users having a high interoceptive awareness already have better hearing perception that users having a low interoceptive awareness. This means that less assistance is required for users having a high interoceptive awareness in comparison to users having a low interoceptive awareness.

In addition, the setting values of further setting parameters are preferably defined in dependence on the defined interoceptive awareness. These are, for example, the amplification.

Overall, signal processing in the hearing aid is set in dependence on the interoceptive awareness so that the assistance and thus the degree of signal processing by the hearing aid is lower in the case of a user having high interoceptive awareness than in the case of a user having lower interoceptive awareness. Overall, this therefore has the result that the signal processing of the input signal provided by the hearing aid is less strong in the case of users having high interoceptive awareness. This is understood to mean that the input signal is influenced and changed less strongly, i.e.—in comparison to an unprocessed surroundings signal—a less strongly changed and therefore also less strongly disturbed surroundings signal (sound signal) is emitted. This also has the result that only minor familiarization of the user is required. In addition, the lower signal processing also results in a lower energy consumption.

A fitting process is often provided for the individual fitting of the settings of a hearing aid to the user, in which the setting values are changed in the course of time and successively approximated to a desired target value which compensates for the hearing impairment as optimally as possible. This procedure is also designated as acclimatization. This is based on the consideration that it is often necessary for the setting values still to induce a comparatively moderate change in the hearing perception initially at the beginning of the fitting process (i.e., only minor signal processing), since otherwise the user is overwhelmed and the acceptance suffers from this.

In one preferred embodiment, it is now provided in the definition of the fitting process that a speed at which the setting values are changed in the course of things, thus the speed of the acclimatization, is set in dependence on the interoceptive awareness. Specifically, preferably a greater speed and thus a faster setting of the target value is performed in the case of a high interoceptive awareness than in the case of a user having a lower interoceptive awareness. An improvement of the acceptance is therefore also achieved by this measure. The acclimatization is therefore a parameter of the fitting process which is set in dependence on the established interoceptive awareness.

In carrying out the fitting process, especially in the setting of the setting values for the setting parameters or also in the above-described definition of the speed of the acclimatization, a configuration of the hearing aid is generally required. For this purpose, the required setting values are preferably determined by the setting device and also transmitted to the hearing aid, which is thus insofar parameterized and set. The entire setting process generally requires a large number of inputs or interactions with the user, for example, also to establish the hearing impairment, in order to then divide the setting values in dependence thereon.

Automatic assistance of the user is preferably provided in these adaptations by the setting device. Different degrees of automatic assistance are preferably provided in this case. The automatic assistance is preferably selected on the basis of the established interoceptive awareness. This is understood to mean that a high or low level of assistance takes place—depending on the established interoceptive awareness. In the case of a high level of assistance, in particular a menu navigation is provided to the user, which represents the individual steps in more detail and more precisely and thus offers a high level of assistance. Vice versa, in the case of a low level of assistance, a menu navigation different therefrom having, for example, fewer details is provided. This embodiment is also based on the finding in this case that users having high interoceptive awareness are accompanied by a higher level of comprehension and therefore require less assistance. The acceptance is also increased overall in this way.

In one preferred refinement, it is finally provided that the interoceptive awareness is trained. In particular, this preferably again takes place with the aid of the system, especially with the aid of the setting device. This embodiment is based in this case on the finding that it is possible in principle to improve the interoceptive awareness. The capability of the user for hearing perception is therefore improved overall by the improvement of the interoceptive awareness and thus in particular also the subjective feeling of success and thus the acceptance of the hearing aid. In addition, it is also achieved in this way that only a minor degree of signal processing is required.

After the training is carried out, the achieved degree of the interoceptive awareness is then preferably established again, in particular determined by using the system and accordingly the adapted process is defined on the basis of the (improved) interoceptive awareness. In general, in this way the highest possible interoceptive awareness is achieved, which fundamentally results in improved acceptance.

Processes and methods for training the interoceptive awareness are known in principle and are described, for example, in Meyerholz, Luisa, et al. "Contingent biofeedback outperforms other methods to enhance the accuracy of cardiac interoception: A comparison of short interventions." Journal of behavior therapy and experimental psychiatry 63 (2019): 12-20.

The determination of the interoceptive awareness is preferably performed in general on the basis of an interoceptive perception of a cardiological signal, especially the pulse, by the user himself or herself. Interoceptive perception is understood in this case as a perception of one's own pulse (heartbeat) of the user without external aids and also without directly feeling the pulse, for example, on the wrist, on the neck, etc.

For this determination, in particular in one preferred embodiment, the assistance by a device is provided in this case, namely, for example, by the hearing aid itself or by another device, for example a portable device of the user, for example a smart phone. This device, which is part of the overall system for fitting the hearing aid, is configured in this case in such a way that a task is given to the user, namely in particular to register his or her pulse (without aids) and that furthermore a user input is registered as a response to the task through this device or through a further device. The interoceptive awareness is then inferred by the system on the basis of the user input.

In one preferred refinement, the system furthermore includes a monitor for actually registering the pulse of the user. This is configured in this case in such a way that it is thus activated in such a way that simultaneously to the task assignment, the actual pulse is registered at the user and is compared to the user input and finally the interoceptive awareness is inferred from this comparison. The monitor for registering the pulse is preferably the hearing aid itself. The hearing aid is thus configured to measure the pulse of the user. For this purpose, the signal received through the input-side sound transducer is preferably evaluated with regard to the heart rate of the user of the hearing aid, who currently also wears it.

In one preferred embodiment, the user is generally assisted through a menu navigation in the determination and/or in the training of his or her interoceptive awareness. An app is generally provided for this purpose, which is preferably implemented on a smart phone, tablet, or another, in particular portable playback device, through which the user input is preferably also displayed at the same time. The user inputs can also be input through this device, for example through a touchscreen.

In one preferred embodiment, an acoustic or optical pulse frequency is presented to the user through this device and in addition a setting option for the presented pulse frequency, so that the user can thus change the presented pulse frequency.

Thus, for example, in the optical display of the pulse frequency, a pulsating symbol, for example a heart, is displayed on the display and the user receives the possibility of changing the pulse frequency and adapting it as much as possible to their own perceived pulse frequency by using an input, for example a slide controller displayed on the display. The setting of this pulse frequency perceived by the user represents the user input which is compared to the actually measured pulse frequency.

Alternatively to this optical symbol, a pulsating acoustic signal is presented to the user, especially through the hearing aid, wherein the user can also set the pulse frequency in this case, for example, through an input aid, such as the described slide controller through the device and can adapt it to their own perceived pulse frequency.

According to a third embodiment variant, it is finally provided that a duration is specified to the user through the device, preferably multiple times, for example 3-5 times in succession, and the user is to determine in each case the number of his or her heartbeats during this duration without aids and without feeling the pulse and is to input the corresponding counter.

Especially for the determination or also in the training of the interoceptive awareness, the system generally has a display element, for example a mobile telephone, tablet, etc., and an input element, which can be formed by a touchscreen of the display element.

The above-described training is preferably also based in general on the interoceptive perception of cardiological signals, especially the user's own pulse. Preferably—similarly as in the above-described determination of the interoceptive awareness—on the basis of a cardiological signal, the awareness is trained in that the user is additionally also presented with feedback, for example haptic or acoustic feedback, which is in particular generated using the hearing aid itself, so that the perception is trained and taught with regard to the pulse. This feedback is that, for example, the user is preferably presented with their own (actual) heart rate through the hearing aid as an acoustic signal, wherein this presentation is noticeably scaled back in the course of the training, so that the interoceptive perception is noticeably taught and thus improved by this measure. In the case of haptic assistance, for example, a vibration is presented to the user.

The mentioned setting device of the system, with the aid of which, on the one hand, the interoceptive awareness is established and using which, on the other hand, the fitting process is also defined, is preferably formed in general as a device having a computing unit, especially by a device which is portable in particular, especially a user's own device, for example the above-mentioned smart phone, tablet, etc.

Either tables or algorithms are stored in the computing unit, through the use of which the interoceptive awareness is inferred on the basis of the user inputs and/or the setting values or speed for the automation are selected. Finally, this setting device is generally configured for mutual communication with the hearing aid through a suitable communication interface such as, for example, a Bluetooth interface and in particular for transmitting and importing the selected fitting process having the selected setting parameters.

Other features which are considered as characteristic for the invention are set forth in the appended claims.

Although the invention is illustrated and described herein as embodied in a method and a system for fitting a hearing aid to a user, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The FIGURE of the drawing is a greatly simplified block diagram of a system for fitting a hearing aid, according to an exemplary embodiment of the invention which will be explained in more detail below.

DETAILED DESCRIPTION OF THE INVENTION

Referring now in detail to the single FIGURE of the drawing, there is seen a system 2 which is configured for fitting a hearing aid 4 to a user N of the hearing aid 4. The system 2 includes the hearing aid 4 and, in the exemplary embodiment, a further device, especially a mobile terminal, such as a smart phone 6, a tablet, or the like.

The hearing aid 4 is a hearing aid device which includes an input transducer 8, typically a microphone, a signal processing unit 10 having typically a microprocessor, and an output transducer 12, typically a loudspeaker. An incoming signal, typically an acoustic sound signal, is converted by the input transducer 8 into an electrical input signal, which is processed by the signal processing unit 10 in dependence on a user-specific hearing impairment and is emitted as an electrical output signal at the output transducer 12, which converts it into a typically acoustic output signal. Different types of hearing aids 4 are known in principle, for example BTE, ITE, or also CIC hearing aids.

The hearing aid 4 has to be fitted to the user N in each case. For this purpose, setting values E for various setting parameters, such as frequency-dependent amplification values for amplifying the input signal, a noise suppression, and/or a directionality are also defined in particular and communicated to the signal processing unit 10. The setting values E are determined and set in the context of a fitting process. This is carried out by interaction with the user N. In the present case, the setting values E are also selected on the basis of the interoceptive awareness I of the user N.

The smart phone 6 fulfills multiple functions simultaneously in this case: it assumes the functions of a setting device 14 and uses its integrated computing unit 15 for this purpose. Furthermore, it fulfills the function of a display element 16 with the aid of its display screen configured as a touchscreen. In addition, it also assumes the function of an input aid 18, also with the aid of the touchscreen.

The sequence for fitting the hearing aid 4 is in particular as follows in this case:

In a first step, the interoceptive awareness I, also designated as interoceptive perception, is determined by the system 2 itself. Various possibilities are open for this purpose. All methods are based in this case on the evaluation and determination of a cardiological signal, especially the heart rate, thus the pulse of the user N. The various methods are based in this case on the user N quasi-estimating his or her pulse through the interoceptive perception and communicating this through the input aid 18 of the setting device 14. At the same time, the actual pulse is measured, for example through the hearing aid 4 or through the smart phone 6. The measured value is compared to the value input by the user N and a value for the interoceptive awareness I of the user N is determined and defined therefrom through the use of known algorithms, as are known from the literature.

According to a first variant, in this case the user N is visually or acoustically prompted for this purpose to match a specified pulse signal to his or her own perceived pulse.

For the visual option, in this case a pulsing symbol is displayed on the display element 16 and the user N receives the prompt to match the presented pulse frequency of the symbol through the use of the input aid 18, for example by a displayed slide controller, to his or her own perceived pulse frequency.

In an acoustic option, a tone sequence having a specified pulse frequency is presented to the user N, for example ten individual tones uniformly spaced apart from one another, which are to quasi-simulate the pulse. For example, the user N can select between specified, different tone sequences having different pulse frequencies in order to select the one which matches best with the perceived pulse. Alternatively, a setting of the pulse frequency can also again take place directly in this case through a slide controller, for example.

In a second variant, the user N is prompted to count the heartbeat perceived by him or her over a specific duration. For this purpose, a starting signal and an end signal are communicated to the user N by the display element 16 or also acoustically. The user then inputs the number of heartbeats perceived by him or her. This is preferably repeated multiple times.

The system 2 furthermore gives further supplementary instructions, for example optically through the display element 16 or also acoustically, for example, through the smart phone 6 or also through the hearing aid 4, especially the procedure to be used in registering one's own pulse. For example, the user is prompted to initially carry out a rest phase for a certain time, to stay in a suitable room, sit down, and in particular that he or she is not to use any aids for the determination of his or her pulse and also not to feel his or her pulse.

As already mentioned above, the actual pulse is measured in parallel thereto, for example through the hearing aid 4 or also by the smart phone 6 or by another device.

The interoceptive awareness I of the user N is determined from the comparison between the values input by the user N and the actually measured values.

A classification into different classes takes place on the basis of the determined value, for example two to five classes, and preferably only into two classes, namely a low and a high interoceptive awareness I. With a low awareness I, the user has a lower noise tolerance, i.e., noisier surroundings have the result that the user can only filter out speech poorly from these noisy surroundings. This has the result that such a user has an increased need for assistance by the hearing aid 4, which is displayed, for example, in increased noise suppression and in an increased directionality. Furthermore, a longer acclimatization to the hearing aid 4 is typically also required with such users N. I.e., the duration until the setting values E are led to a desired target value is longer with such users N than with users N having high interoceptive awareness I.

In a second step, the setting values E and the speed (duration) for the acclimatization are defined by the setting device 14 through the use of the selected class for the interoceptive awareness I. It is to be emphasized in this case that the setting values E differ even with identical hearing impairments of different users N if the users N have different interoceptive perceptions.

The setting values E for the noise suppression and the directionality are specially set in dependence on the interoceptive awareness I.

Preferably, the assistance, for example, in the menu navigation, in particular in the determination of the hearing impairment and the setting values E, is furthermore also dependent on the interoceptive awareness I. The same applies to the speed of the acclimatization, thus the speed at which the respective parameters are approximated to the target values. This duration until the desired target values of the setting values E are reached can be between several days and weeks in this case.

The setting values E defined by the setting device 14 and the speed of the acclimatization are communicated through a communication interface 20 in the hearing aid 4 and stored there as a parameter set for the signal processing unit 10.

The following is a summary list of reference numerals and the corresponding structure used in the above description of the invention.

LIST OF REFERENCE SIGNS

2 system
4 hearing aid
6 smart phone
8 input transducer
10 signal processing unit
12 output transducer
14 setting device
15 computing unit
16 display element
18 input aid
20 combination interface
N user
I interoceptive awareness
E setting value

The invention claimed is:

1. A method for fitting a hearing aid to a user of the hearing aid, the method comprising steps of:
- establishing an interoceptive awareness of the user;
- defining a fitting process for fitting the hearing aid based on the established interoceptive awareness of the user;
- automatically changing a setting value of at least one setting parameter of the hearing aid in a course of the fitting process; and
- setting a speed of an adjustment of the setting value in dependence on the interoceptive awareness.

2. The method according to claim 1, which further comprises using a setting device to determine the interoceptive awareness for defining the fitting process.

3. The method according to claim 1, which further comprises defining setting values for setting parameters of the hearing aid based on the interoceptive awareness of the user.

4. The method according to claim 1, which further comprises setting at least one of a degree of a noise suppression or a directionality in dependence on the interoceptive awareness, and reducing at least one of the degree of noise suppression or the degree of directionality with increasing interoceptive awareness.

5. The method according to claim 1, which further comprises setting a signal processing unit of the hearing aid in dependence on the interoceptive awareness, causing an assistance by the hearing aid to be less for a user having higher interoceptive awareness than for a user having lower interoceptive awareness.

6. The method according to claim 1, which further comprises using a setting device to automatically assist the user in the fitting process, and selecting the automatic assistance of the user based on the established interoceptive awareness.

7. The method according to claim 1, which further comprises training the interoceptive awareness of the user and then establishing the interoceptive awareness again and defining the fitting process.

8. The method according to claim 1, which further comprises:

determining the interoceptive awareness by using a device selected from the group including the hearing aid, another device and a portable device of the user giving a task to the user;

registering a user input of the user; and inferring the interoceptive awareness in dependence on the user input.

9. The method according to claim 8, which further comprises registering the pulse of the user as the task, using a monitor or the hearing aid to simultaneously determine the actual pulse, and comparing the actual pulse to the user input.

10. The method according to claim 8, which further comprises offering an acoustic or optical pulse frequency and a setting possibility for a presented pulse frequency to the user.

11. The method according to claim 10, which further comprises displaying a symbol pulsing with the pulse frequency to the user, and allowing the user to vary the pulse frequency.

12. The method according to claim 10, which further comprises presenting a tone sequence having the pulse frequency to the user through the hearing aid, and allowing the user to vary the pulse frequency.

13. The method according to claim 8, which further comprises specifying a duration multiple times to the user, and prompting the user to input heartbeats registered by the user during the duration.

14. A system for fitting a hearing aid to a user of the hearing aid, the system comprising:

a hearing aid; and a setting device, said setting device configured to establish an interoceptive awareness of the user and to define a fitting process for fitting said hearing aid based on the established interoceptive awareness;

a setting value of at least one setting parameter of the hearing aid being automatically changed in a course of the fitting process, and a speed of an adjustment of the setting value being set in dependence on the interoceptive awareness, or the interoceptive awareness being determined by providing a registration of a cardiological signal of the user by the user without external aids, and a menu navigation presented on a device being used to assist the user in providing the registration of the cardiological signal.

15. The system according to claim 14, wherein said setting device is a portable device of the user.

16. The system according to claim 15, wherein said portable device is a smart phone or a tablet.

17. A method for fitting a hearing aid to a user of the hearing aid, the method comprising steps of:

establishing an interoceptive awareness of the user;

defining a fitting process for fitting the hearing aid based on the established interoceptive awareness of the user;

determining the interoceptive awareness by providing a registration of a cardiological signal of the user by the user without external aids; and using a menu navigation presented on a device to assist the user in providing the registration of the cardiological signal.

18. The system according to claim 14, wherein said setting device includes a communication interface for communication with the user, a display element, an input aid for registering an input of the user, and a computing unit configured to establish the interoceptive awareness and define a fitting process in dependence on user inputs.

* * * * *